US008067895B1

(12) United States Patent
Lee

(10) Patent No.: US 8,067,895 B1
(45) Date of Patent: Nov. 29, 2011

(54) LAMP ADAPTER

(76) Inventor: Pei-Yu Lee, Taoyuan (TW)

( * ) Notice: Subject to any disclaimer, the term of this patent is extended or adjusted under 35 U.S.C. 154(b) by 574 days.

(21) Appl. No.: 12/277,300

(22) Filed: Nov. 25, 2008

(51) Int. Cl.
*H05B 37/00* (2006.01)
*G05B 1/00* (2006.01)

(52) U.S. Cl. .................................... 315/241 R; 307/291

(58) Field of Classification Search .................. 315/291, 315/307, 241 R, 91, 51, 232, DIG. 2, DIG. 4
See application file for complete search history.

(56) References Cited

U.S. PATENT DOCUMENTS 4,348,614 A * 9/1982 Burgess ........................ 315/189
6,043,615 A * 3/2000 Forbes .......................... 315/291
6,168,289 B1 * 1/2001 Shah ............................. 362/221
7,067,992 B2 * 6/2006 Leong et al. .................. 315/291

* cited by examiner

*Primary Examiner* — Douglas W Owens
*Assistant Examiner* — Minh D A
(74) *Attorney, Agent, or Firm* — Egbert Law Offices PLLC

(57) ABSTRACT

The present invention provides a lamp adapter, including a first adapter, a second adapter and a short-circuit. These two adapters are separately coupled between two incoming ends of T5 lamp and T8 socket. The first adapter contains a circuit board, and the second adapter is used for the coupling of the other pin pitch of the lamp. The short-circuit enables functional short-circuiting of the starter of T8 socket, so that the current from the power supply is fed from both ends of T5 lamp to highlight T5 lamp through the circuit of first and second adapters. The shunt circuit is arranged between the connecting circuit (of the input inductor and T5 lamp connector terminal) and cathode loop. The T5 lamp can be mounted onto the T8 socket without changing any structure and components, thus realizing energy-saving and environmental protection with higher intensity of illumination.

2 Claims, 3 Drawing Sheets

LAMP ADAPTER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to an adapter exclusively used for the lamp, and more particularly to an innovative adapter, which allows installation of a T5 lamp onto a T8 socket.

2. Description of Related Art Including Information Disclosed Under 37 CFR 1.97 and 37 CFR 1.98.

With ever-changing progress, the manufacturing technology and quality of lamps are improving continuously, e.g. the up-to-date T5 lamps' illumination efficiency is 30% higher than traditional T8 lamps, with the color rendition almost similar to the sunlight. So, such lamps are an ideal option for environmental protection and widely applied in many countries. Yet, some actual problems will be encountered due to different dimensions of T5 and T8 lamps, e.g. the standard T5/28 W lamp is approx. 60 mm shorter than T8/40 W lamp. Also, there are varying connecting pins at the receiving terminals, i.e. T5 lamps cannot be mounted onto T8 lamp sockets and have to be replaced along with the well-functioned sockets, leading to a serious waste of resources, especially in the shipping centers where thousands of lamps are often removed together with the operable sockets.

Thus, to overcome the aforementioned problems of the prior art, it would be an advancement in the art to provide an improved structure that can significantly improve efficacy.

Therefore, the inventor has provided the present invention of practicability after deliberate design and evaluation based on years of experience in the production, development and design of related products.

BRIEF SUMMARY OF THE INVENTION

Based on the unique structure of the present invention that the lamp adapter mainly comprises a first adapter, a second adapter and a short-circuit, these two adapters are separately coupled between two incoming ends of T5 lamp and T8 socket. The first adapter contains a circuit board to accommodate the bridge rectifier and power factor correction circuit, and the second adapter is used for the coupling of the other pin pitch of the lamp. The short-circuit enables functional short-circuiting of the starter of T8 socket, so that the current from the power supply is fed from both ends of T5 lamp to highlight T5 lamp through the circuit of first and second adapters. With the lamp adapter of the present invention, the T5 lamp can be mounted onto a T8 socket without changing any structure and components, thus realizing energy-saving and environmental protection with higher intensity of illumination.

Based on the structure of the present invention that the circuit of the first adapter comprises an adjustable highlighting and preheating current element, the preheating soft startup allows the highlighting to trigger after the filament reaches sufficient temperature, thus making it possible to extend the service life of lamp, adjust the preheating time and preheating current and adapt to low temperature, different climates and lamp brands.

Based on the unique structure of the present invention that a shunt circuit is arranged between the connecting circuit of the input inductor and T5 lamp connector terminal and cathode loop 75, and provided with a capacitor, the current flowing through the filament could be bypassed to the cathode loop, so as to overcome excessive current and overheating of components, extend the service life of lamp adapter and improve the quality and applicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
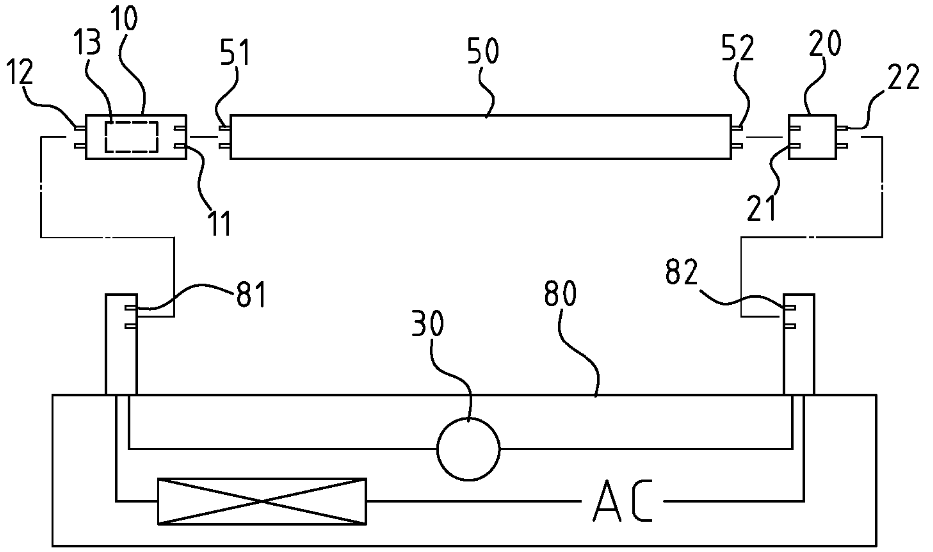
FIG. 1 shows a schematic view of the assembly relation of the lamp adapter and T8 socket of the present invention.
Figure 2:
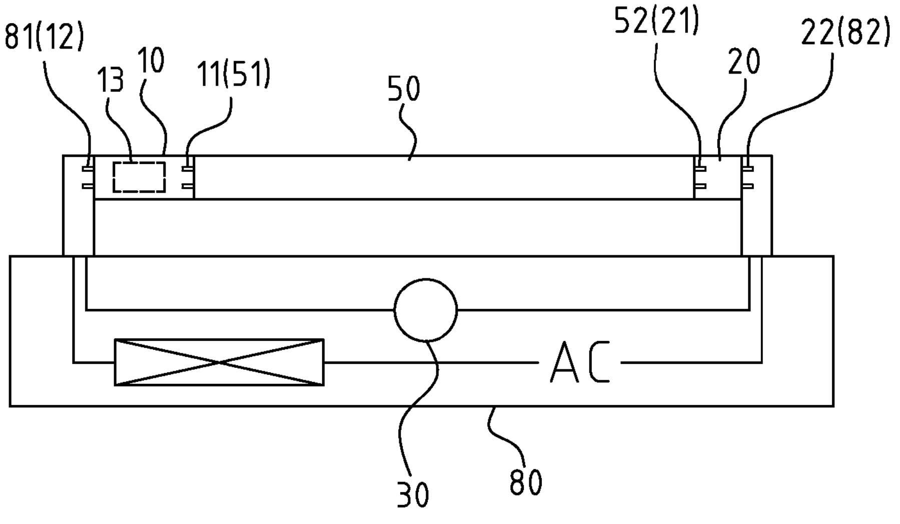
FIG. 2 shows another schematic view of the assembly relation of the lamp adapter and T8 socket of the present invention.
Figure 3:
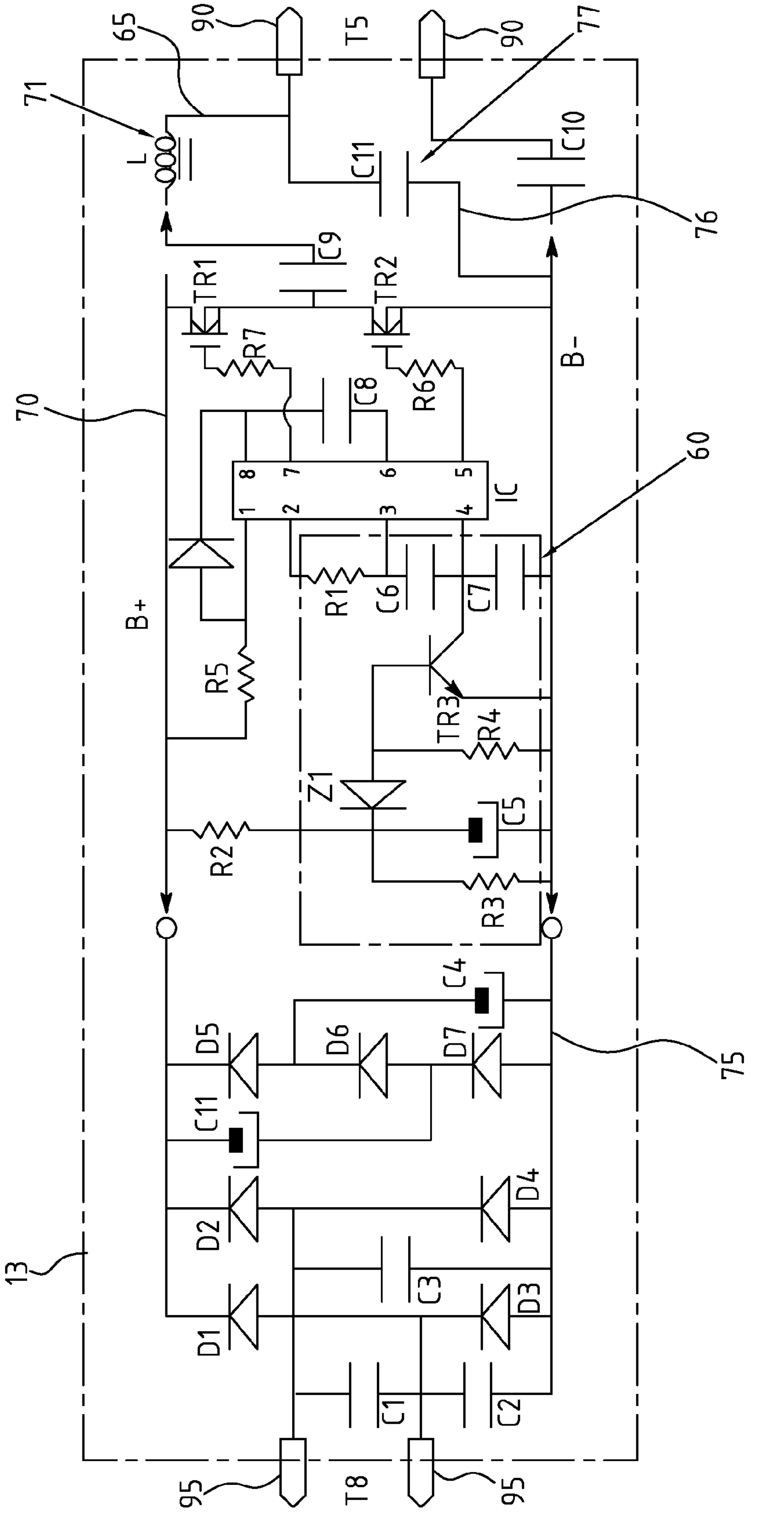
FIG. 3 shows a schematic view of the preferred embodiment of the circuit of lamp adapter of the present invention.

FIGS. 1-3 depict a preferred embodiment of a lamp adapter of the present invention. The embodiments are only provided for explanatory purposes.

The lamp adapter enables T5 lamp 50 to be mounted onto the T8 socket 80. As a T5/28 W lamp is approx. 60 mm shorter than T8/40 W lamp, a lamp adapter can be formed in this spacing.

The lamp adapter comprises a first adapter 10, containing a T5 lamp coupling hole 11 and a T8 socket connecting pin 12. The first adapter 10 is provided with an circuit board 13, which is fitted with bridge rectifier, power factor correction circuit, high-frequency and DC common territorial circuit. The first adapter 10 is coupled between the first incoming end 51 of T5 lamp 50 and first supply end 81 of T8 socket 80.

A second adapter 20 contains a T5 lamp coupling hole 21 and a T8 socket connecting pin 22. The second adapter 20 is coupled between the second incoming end 52 of T5 lamp 50 and the second supply end 82 of T8 socket 80. The second adapter 20 is used for the coupling of the pin pitch of second incoming end 52 of T5 lamp 50 and the terminal circuit.

A short-circuit 30 is available with an insertion end the same as the starter of T8 socket 80. This allows for assembly into the coupling portion of the starter of T8 socket 80, bringing about functional short-circuiting of the starter of T8 socket 80 with the short-circuit 30.

A circuit board 13 is assembled within the first adapter 10. The circuit board 13 is fitted with bridge rectifier, power factor correction circuit, high-frequency and DC common territorial circuit. The circuit board 13 contains two T5 lamp connector terminals 90, two T8 lamp connector terminals 95, an anode loop 70, a cathode loop 75, an input inductor 71, of which the input inductor 71 is arranged between T5 lamp connector terminal 90 and anode loop 70.

Moreover, a connecting circuit 65 is arranged between the input inductor 71 and T5 lamp connector terminal 90, and a shunt circuit 76 is arranged additionally between the connecting circuit 65 and cathode loop 75. The shunt circuit 76 is provided with a capacitor 77. Through the circuit of first adapter 10 and second adapter 20, the incoming current of the power supply is fed from both ends of T5 lamp 50 to highlight T5 lamp 50. Meanwhile, T8 socket 80 can also be mounted with T5 lamp 50, thus realizing energy-saving and environmental protection with higher intensity of illumination.

Based on above-specified structure, the present invention is operated as follows:

In order to save the cost and reduce the space, the current electronic rectifier of high power factor has a passive power factor up to 0.95%. A high-inductance stabilizer L of AC power supply of T8 socket 80 is linked in series to the power supply, so a high-inductance stabilizer L can be used to compensate the power factor up to 0.98%, and the high inductance generated also serves as an excellent low-pass filter and suppresses strongly the noise interference input from the power supply. The combined starter of T8 socket 80 can be replaced freely. Thus, when T5 lamp 50 of the present invention is to be mounted onto T8 socket 80, the starter of original T8 socket 80 shall be converted into new short-circuit 30 with the same assembly position. The assembly sequences of the present invention are shown in FIGS. 1 and 2, wherein two incoming ends 51, 52 of T5 lamp 50 are firstly coupled with the first and second adapters 10, 20, and then with two supply ends 81, 82 of T8 socket 80 via T8 socket connecting pins 12, 22 of these two adapters 10, 20. So, the current of the power supply can flow into the adapter through high-inductance stabilizer L of T8 socket 80 and the replaced short-circuit 30, and the current from AC power supply is fed from both ends of T5 lamp 50 to highlight T5 lamp 50 through the circuit of first adapter 10 and second adapter 20.

The present invention is described below with reference to the circuit diagram:

Referring to FIG. 3, the current into the first adapter 10 is fed to IC, TR1 and TR2 so as to highlight T5 lamp 50 through bridge rectifier and power factor correction circuit. Moreover, C10 is a starting capacitor of the present invention, B-is a combined busbar of all circuits, which serves as a common loop of high-frequency circuit, and also a channel of C10 starting capacitor. According to different mounting directions of electronic stabilizers, the channel of the starting capacitor forms a loop from C2 or C3 to B-, while AC power supply could feed the current through original inductive stabilizer, additional short-circuit 30 and filament at any end of T5 lamp 50.

Furthermore, the circuit board 13 of the first adapter 10 of the present invention comprises an adjustable highlighting and preheating current element 60, as shown in FIG. 3, wherein the current charges the electrolytic capacitor C5 through R2, until the preset voltage of C5 brings about voltage breakdown of preset voltage regulator diode Z1. In such a case, Z1 is electrically connected with TR3, leading to C6 earthing short circuit, and rise of inductive capacity despite of malfunction of C7. Moreover, the preheating frequency is lowered to the trigger point of the highlighting frequency, of which the highlighting time depends on the resistance value of R2, i.e. a higher resistance of R2, a longer highlighting time (suitable for frigid zone). The highlighting frequency is determined by the capacity of capacitor C6 linked in series to capacitor C7. The circuit design is characterized in that, preheating soft startup allows to trigger the highlighting after the filament reaches sufficient temperature, thus making it possible to extend the service life of lamp, adjust the preheating time and preheating current and adapt to low temperature, different climates and lamp brands.

Figure 4:
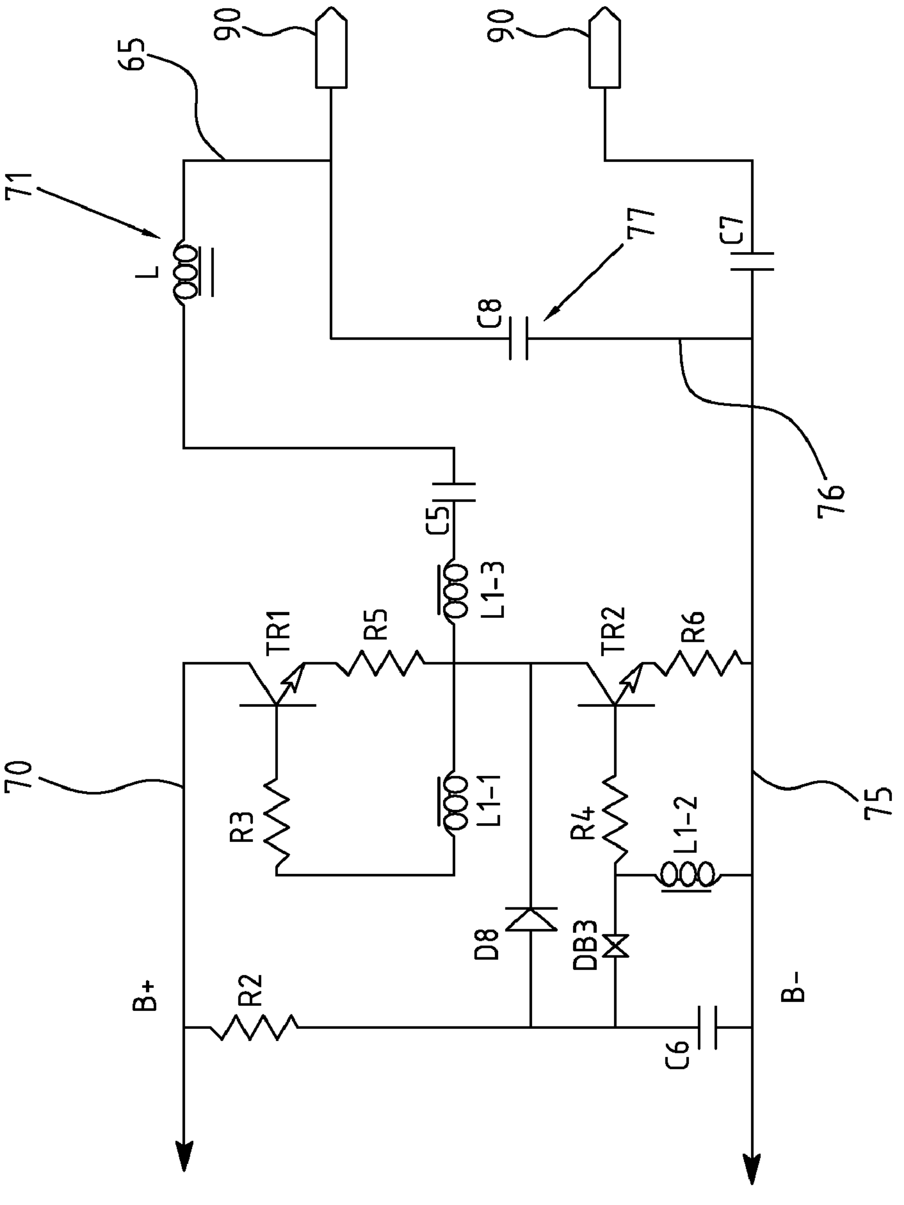
FIG. 4 shows another schematic view of the preferred embodiment of the circuit of lamp adapter of the present invention.

FIG. 4 depicts another preferred embodiment of the circuit configuration of the present invention. The difference between FIG. 4 and FIG. 3 is that adjustable highlighting and preheating current element 60 is neglected. The stable current state in FIG. 4 could meet different customer demands.

I claim:

1. A lamp adapter, comprising:

a first adapter, being comprised of a T5 lamp coupling hole and a T8 socket connecting pin and being coupled between a first incoming end of said T5 lamp and a first supply end of said T8 socket;

a second adapter, being comprised of a T5 lamp coupling hole and a T8 socket connecting pin and being coupled between a second incoming end of said T5 lamp and a second supply end of said T8 socket, said second adapter coupling of a pin pitch of the second incoming end of said T5 lamp;

a short-circuit, having an insertion end identical to a starter of T8 socket, being assembled on the coupling portion of the starter of T8 socket, bringing about functional short-circuiting of the starter of T8 socket with the short-circuit, the T5 lamp have both ends supplied by current from the power supply to highlight T5 lamp through the circuit of first adapter and second adapter;

a circuit board, being assembled within said first adapter, being fitted with a bridge rectifier, power factor correction circuit, high-frequency and DC common territorial circuit, and being comprised of two T5 lamp connector terminals, two T8 lamp connector terminals, an anode loop, a cathode loop, an input inductor, the input inductor being arranged between T5 lamp connector terminal and anode loop; and a shunt circuit, being arranged between a connecting circuit of the input inductor and T5 lamp connector terminal and the cathode loop, the cathode loop being provided with a capacitor.

2. The lamp adapter defined in claim 1, wherein the circuit board of the first adapter comprises an adjustable highlighting and preheating current element.

* * * * *